United States Patent
Tsai et al.

(10) Patent No.: US 11,177,731 B2
(45) Date of Patent: Nov. 16, 2021

(54) CURRENT DETECTING CIRCUIT AND METHOD FOR CONSTANT ON-TIME POWER CONVERTER

(71) Applicant: ANPEC ELECTRONICS CORPORATION, Hsinchu (TW)

(72) Inventors: Ming-Liang Tsai, Hsinchu (TW); Shih-Chung Wei, Hsinchu (TW)

(73) Assignee: ANPEC ELECTRONICS CORPORATION, Hsinchu (TW)

( * ) Notice: Subject to any disclaimer, the term of this patent is extended or adjusted under 35 U.S.C. 154(b) by 106 days.

(21) Appl. No.: 16/833,753

(22) Filed: Mar. 30, 2020

(65) Prior Publication Data

US 2021/0184559 A1    Jun. 17, 2021

(30) Foreign Application Priority Data

Dec. 11, 2019    (TW) .................................. 108145292

(51) Int. Cl.
*H02M 1/08* (2006.01)
*H02M 1/00* (2006.01)

(52) U.S. Cl.
CPC ............ *H02M 1/083* (2013.01); *H02M 1/009* (2021.05); *H02M 1/0096* (2021.05)

(58) Field of Classification Search
CPC ..... H02M 1/083; H02M 1/009; H02M 1/0096
USPC .......................................................... 307/31
See application file for complete search history.

(56) References Cited

U.S. PATENT DOCUMENTS

| | | | | |
|---|---|---|---|---|
| 2009/0066157 | A1* | 3/2009 | Tarng .................. | H03B 5/1228 307/31 |
| 2012/0032728 | A1* | 2/2012 | Coleman .............. | H02M 3/158 327/434 |
| 2021/0143725 | A1* | 5/2021 | Deng ...................... | H02M 1/08 |
| 2021/0211048 | A1* | 7/2021 | Yu ......................... | H02M 3/158 |

FOREIGN PATENT DOCUMENTS

| | | |
|---|---|---|
| CN | 106664018 B | 9/2019 |
| TW | 201134072 A1 | 10/2011 |

\* cited by examiner

*Primary Examiner* — Tomi Skibinski
(74) *Attorney, Agent, or Firm* — Li & Cai Intellectual Property (USA) Office

(57) ABSTRACT

A current detecting circuit of a constant on-time power converter and a method thereof are provided. The current detecting circuit includes a time detecting circuit and a sample and hold circuit. A control circuit of the constant on-time power converter outputs a lower bridge conduction signal to turn on a lower bridge switch during an on-time of each cycle of the lower bridge conduction signal. The time detecting circuit detects the on-time of a cycle of the lower bridge conduction signal. The sample and hold circuit samples and holds a current of an inductor at a detection time point of a next cycle of the lower bridge conduction signal. A time between a rising edge of a waveform of the next cycle of the lower bridge conduction signal and the detection time point is equal to half the on-time.

6 Claims, 5 Drawing Sheets

CURRENT DETECTING CIRCUIT AND METHOD FOR CONSTANT ON-TIME POWER CONVERTER

CROSS-REFERENCE TO RELATED PATENT APPLICATION

This application claims the benefit of priority to Taiwan Patent Application No. 108145292, filed on Dec. 11, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a constant on-time power converter, and more particularly to a current detecting circuit and method of a constant on-time power converter.

BACKGROUND OF THE DISCLOSURE

Power management in a system is often implemented by a constant on-time power converter to supply operating voltages at different levels. Under ideal conditions, the constant on-time power converter is capable of providing a stable output voltage and a wide range of output current. As a result, when an instantaneous change of a resistance of a load occurs, the output voltage of the constant on-time power converter is still maintained at an original voltage level, and a current flowing to the load in response to the output voltage is quickly provided by the constant on-time power converter. Therefore, the constant on-time power converter can efficiently realize voltage conversion. However, in practice, a time during which a lower bridge switch of the on-time power converter is turned on is difficult to be calculated. A conventional current detecting circuit detects a current value at each of time points in the time during which the lower bridge switch is turned on, and calculates an average current value of the current values at all of the time points. The current value obtained at the last time point is a valley value, which results in a difference between the calculated average current value and an actual average current value.

SUMMARY OF THE DISCLOSURE

In response to the above-referenced technical inadequacies, the present disclosure provides a current detecting circuit of a constant on-time power converter. The constant on-time power converter includes an upper bridge switch, a lower bridge switch and a control circuit. The control circuit is connected to the upper bridge switch and the lower bridge switch. A node between the upper bridge switch and the lower bridge switch is connected to one terminal of an inductor. Another terminal of the inductor is grounded through a capacitor. The control circuit outputs a lower bridge conduction signal to the lower bridge switch to turn on the lower bridge switch and turns off the upper bridge switch during an on-time of each cycle of the lower bridge conduction signal. The current detecting circuit includes a time detecting circuit and a sample and hold circuit. The time detecting circuit is connected to the lower bridge switch, and configured to detect the on-time of a previous cycle of the lower bridge conduction signal to output an on-time detected signal. The sample and hold circuit is connected to the time detecting circuit. The sample and hold circuit is configured to sample and hold a current of the inductor at a detection time point of a next cycle of the lower bridge conduction signal according to the on-time detected signal. A time between a rising edge of a waveform of the next cycle of the lower bridge conduction signal and the detection time point is equal to half the on-time.

In certain embodiments, a value of the current of the inductor that is sampled by the sample and hold circuit at the detection time point is an average value of the current of the inductor during the on-time.

In certain embodiments, the lower bridge conduction signal is at a high level during the on-time, which represents that the lower bridge switch is turned on and the upper bridge switch is turned off during the on-time.

In addition, the preset disclosure provides a current detecting method of a constant on-time power converter. The constant on-time power converter includes an upper bridge switch, a lower bridge switch and a control circuit. The control circuit is connected to the upper bridge switch and the lower bridge switch. A node between the upper bridge switch and the lower bridge switch is connected to one terminal of an inductor. Another terminal of the inductor is grounded through a capacitor. The control circuit outputs a lower bridge conduction signal to the lower bridge switch to turn on the lower bridge switch during an on-time of each cycle of the lower bridge conduction signal. The control circuit outputs an upper bridge off signal to the upper bridge switch to turn off the upper bridge switch during the on-time. The current detecting method includes the following steps: detecting the on-time of a previous cycle of the lower bridge conduction signal to output an on-time detected signal by a time detecting circuit; and sampling and holding a current of the inductor at a detection time point of a next cycle of the lower bridge conduction signal according to the on-time detected signal by a sample and hold circuit, wherein a time between a rising edge of a waveform of the next cycle of the lower bridge conduction signal and the detection time point is equal to half the on-time.

In certain embodiments, a value of the current of the inductor that is sampled by the sample and hold circuit at the detection time point is an average value of the current of the inductor during the on-time.

In certain embodiments, the current detecting method further includes the following step: outputting the lower bridge conduction signal at a high level to turn on the lower bridge switch and turning off the upper bridge switch during the on-time by the control circuit.

As described above, the present disclose provides the current detecting circuit and method of the constant on-time power converter. The current detecting circuit detects the on-time of the lower bridge switch (which is equal to an off time of the upper bridge switch) during the previous cycle of the lower bridge conduction signal and the time length of the next cycle of the lower bridge conduction signal is accordingly determined. After half the on-time has elapsed from the rising edge of the waveform in the next cycle of the lower bridge conduction signal, the current detecting circuit detects the current of the inductor of the constant on-time power converter to obtain the average current value.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The present disclosure will become more fully understood from the following detailed description and accompanying drawings.

DETAILED DESCRIPTION OF THE EXEMPLARY EMBODIMENTS

Figure 1:
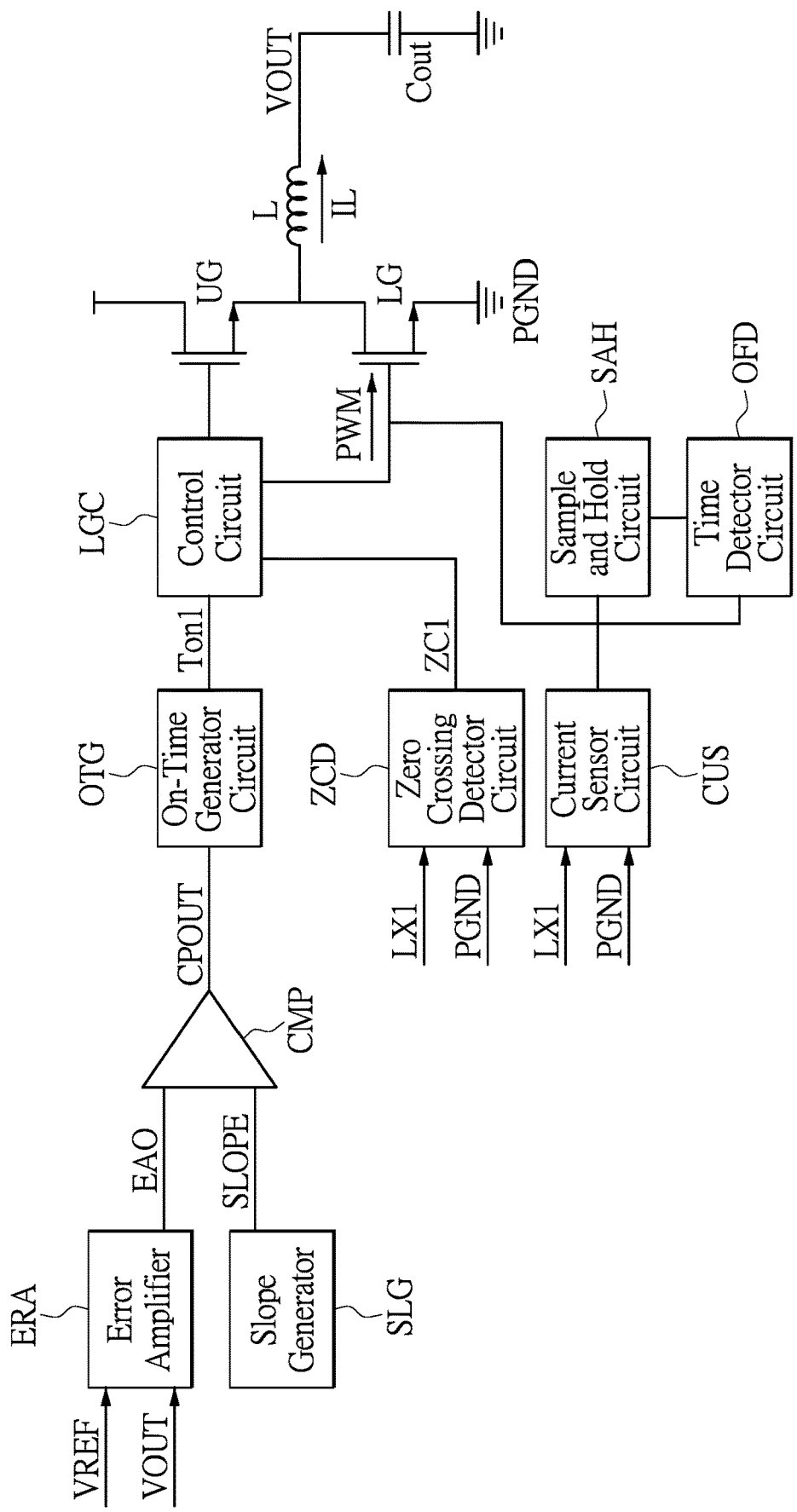
FIG. 1 is a block diagram of a current detecting circuit applied to a constant on-time power converter according to an embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Figure 2:
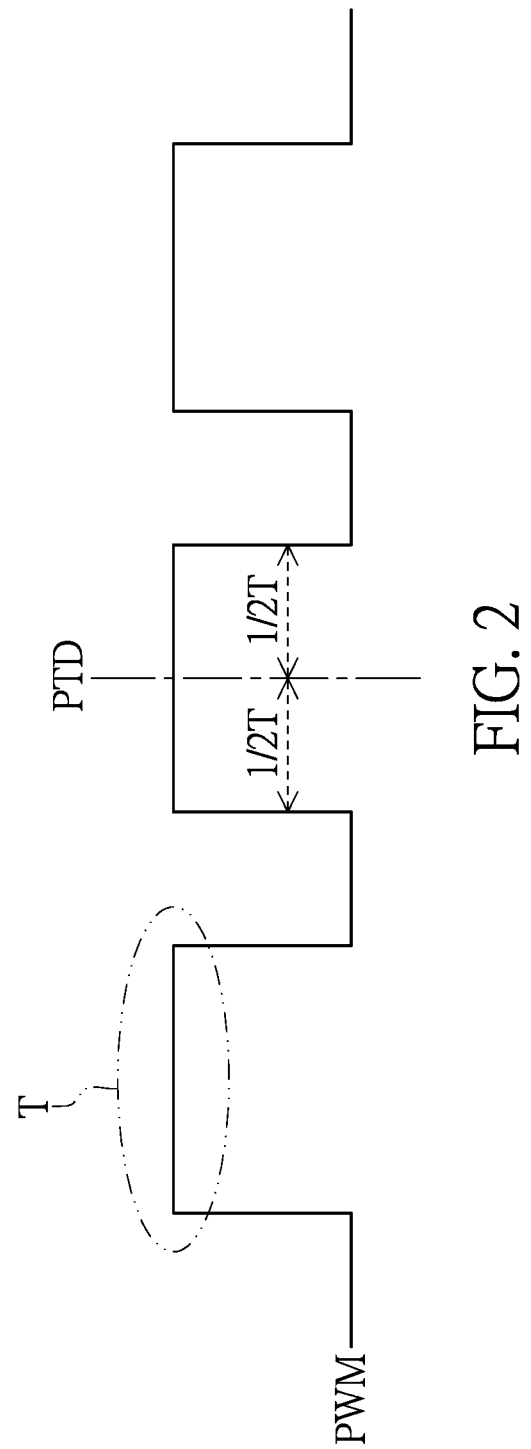
FIG. 2 is a waveform diagram of a lower bridge conduction signal of the constant on-time power converter according to the embodiment of the present disclosure.

Reference is made to FIGS. 1 and 2, wherein FIG. 1 is a block diagram of a current detecting circuit applied to a constant on-time power converter according to an embodiment of the present disclosure, and FIG. 2 is a waveform diagram of a lower bridge conduction signal of the constant on-time power converter according to the embodiment of the present disclosure.

As shown in FIG. 1, in the embodiment, the current detecting circuit includes a time detecting circuit OFD, a sample and hold circuit SAH and a current sensor circuit CUS, which are applied to the constant on-time power converter. The constant on-time power converter includes an error amplifier ERA, a slope generator SLG, a comparator CMP, an on-time generator circuit OTG, an upper bridge switch UG, a lower bridge switch LG, a control circuit LGC and a zero crossing detecting circuit ZCD.

The error amplifier ERA and the slope generator SLG are connected to the comparator CMP. The on-time generator circuit OTG is connected between the comparator CMP and the control circuit LGC. The error amplifier ERA obtains an output voltage of the constant on-time power converter that is a voltage of a capacitor Cout, and amplifies a difference between the output voltage VOUT and a reference voltage VREF by a gain to output an error amplified signal EAO to one terminal of the comparator CMP. The slope generator SLG outputs a slope signal SLPOE to another terminal of the comparator CMP.

The comparator CMP compares a voltage of the error amplified signal EAO with a voltage of the slope signal SLOPE to output a comparing signal CPOUT. An on-time generator circuit OTG outputs a conduction instruction signal Ton1 to the control circuit LGC according to the comparing signal CPOUT. The zero crossing detecting circuit ZCD determines whether or not a current value of a current signal LX1 reaches zero during an on-time of the lower bridge switch LG to output a zero crossing detecting signal ZC1 to the control circuit LGC.

The control circuit LGC is connected to the upper bridge switch UG and the lower bridge switch LG. A node between the upper bridge switch UG and the lower bridge switch LG is connected to one terminal of an inductor L. Another terminal of the inductor L is grounded through the capacitor Cout. The control circuit LGC outputs a lower bridge conduction signal PWM to the lower bridge switch LG to turn on the lower bridge switch LG and outputs an upper bridge off signal to the upper bridge switch UG to turn off the upper bridge switch UG, during an on-time T of each cycle (that is, a working period) of the lower bridge conduction signal PWM, according to the conduction instruction signal Ton1.

It should be understood that the upper bridge switch UG and the lower bridge switch LG are switched complementary. The control circuit LGC outputs the lower bridge conduction signal PWM at a high level as shown in FIG. 2 to the lower bridge switch LG to turn on the lower bridge switch LG. At the same time, the control circuit LGC outputs the upper bridge off signal to the upper bridge switch UG at a low level to the upper bridge switch UG to turn off the upper bridge switch UG. Conversely, the control circuit LGC outputs the lower bridge conduction signal PWM at a low level as shown in FIG. 2 to turn off the lower bridge switch LG. At the same time, the control circuit LGC outputs the upper bridge off signal at a high level to the upper bridge switch UG to turn on the upper bridge switch UG.

It is worth noting that, the lower bridge switch LG is turned on during the on-time T of the lower bridge conduction signal PWM of the constant on-time power converter in a stable condition. The on-time T of the lower bridge conduction signal PWM is a constant value. That is, the on-time T of a next cycle of the lower bridge conduction signal PWM is equal to the on-time T of a previous cycle of the lower bridge conduction signal PWM. Therefore, in the embodiment, the time detecting circuit OFD detects the on-time T of a cycle of the lower bridge conduction signal PWM to output an on-time detected signal.

The sample and hold SAH samples and holds a current IL of the inductor L at a detection time point PTD of the next cycle of the lower bridge conduction signal PWM as shown in FIG. 2 according to the on-time detected signal. A time between a rising edge of a waveform of the next cycle and the detection time point PTD is equal to half the on-time T. In brief, the on-time T of the next cycle is determined according to the on-time T of the previous cycle. When the next cycle of the lower bridge conduction signal reaches half the on-time T that is a working period, the current IL of the inductor L is sampled and held. The held current IL is provided to the current sensor circuit CUS. The current sensor circuit CUS obtains an average current value of the current IL of the inductor L.

Figure 3A:
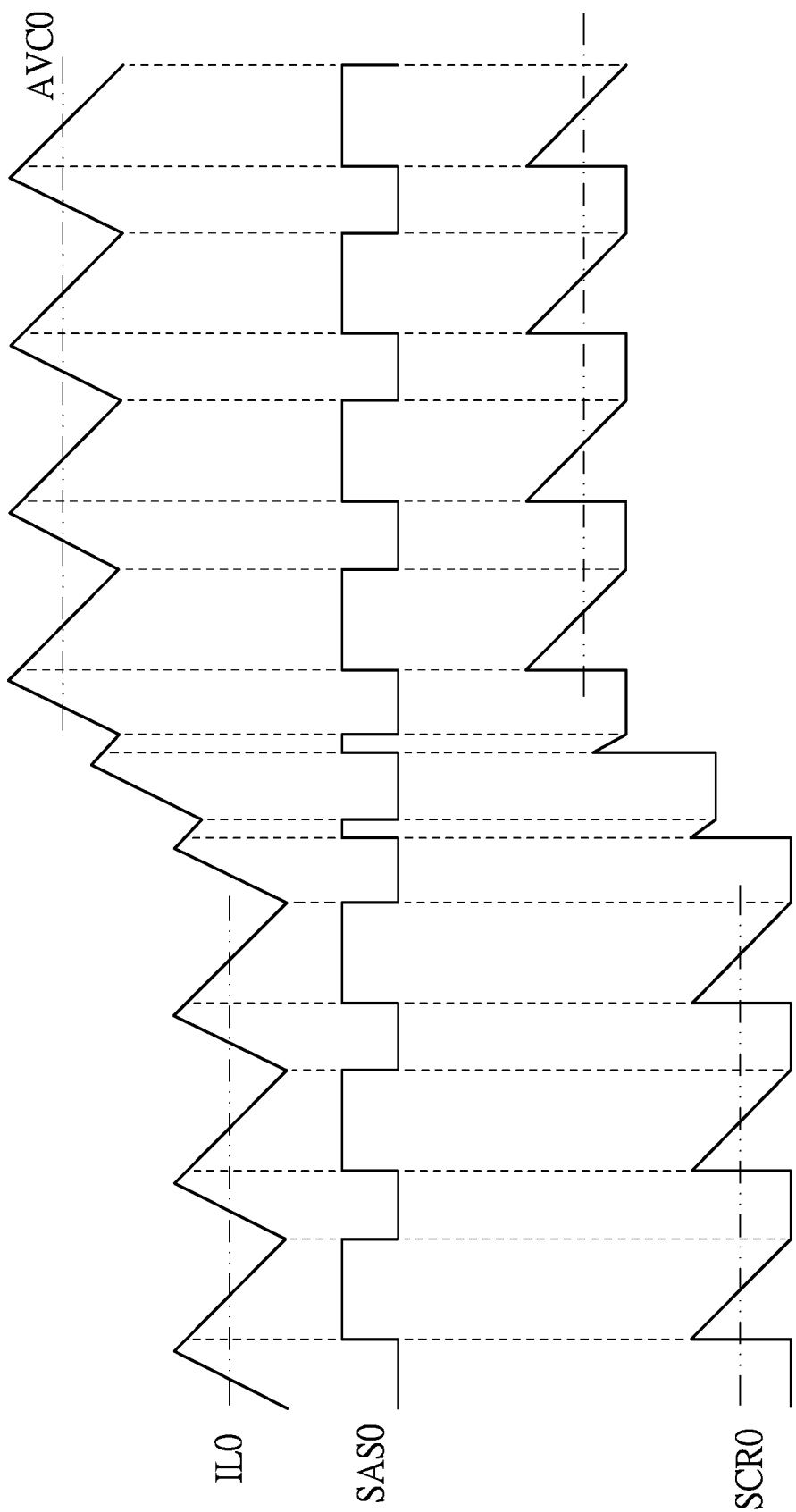
FIG. 3A is a signal waveform diagram of a current of an inductor of the constant on-time power converter and a current of the inductor that is sampled and held by a conventional current detecting circuit.
Figure 3B:
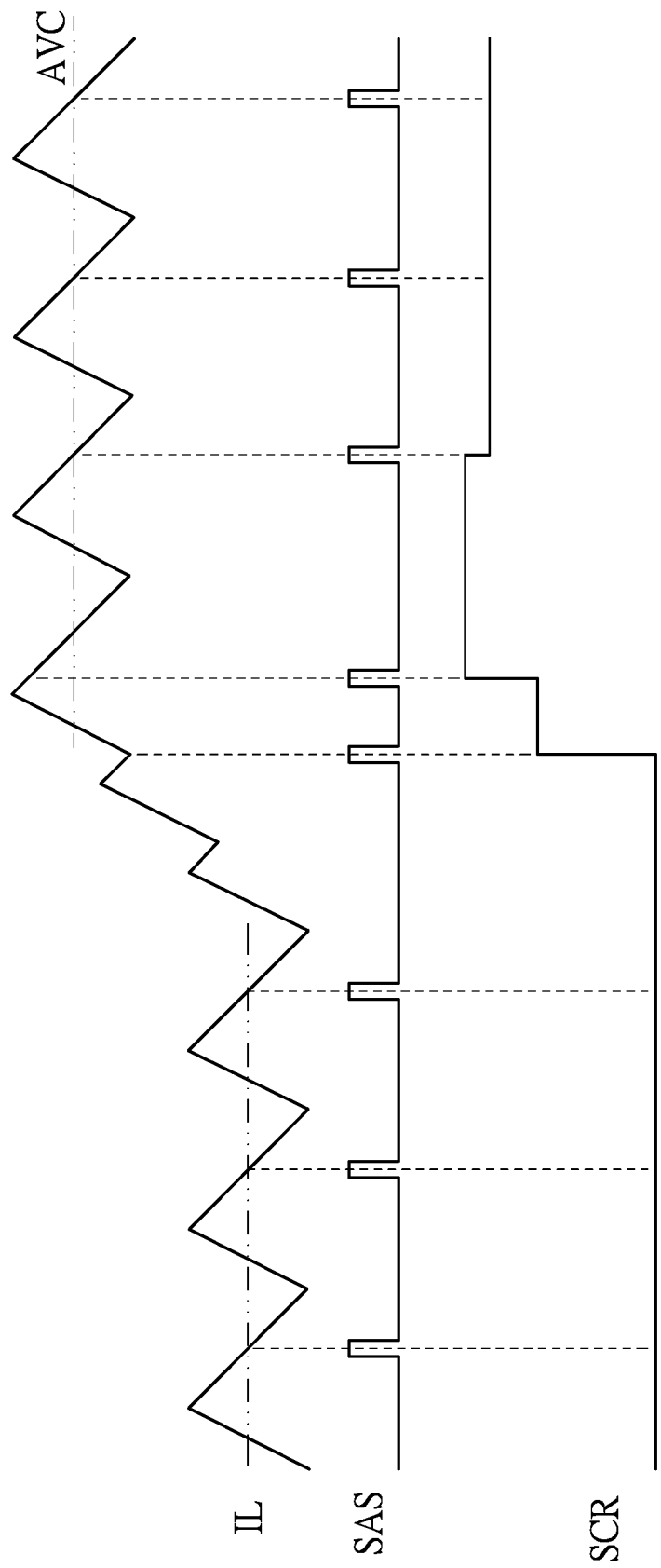
FIG. 3B is a signal waveform diagram of a current of an inductor of the constant on-time power converter and a current of the inductor that is sampled and held by the current detecting circuit of the embodiment of the present disclosure.

Reference is made to FIGS. 1, 2, 3A and 3B, wherein FIG. 3A is a signal waveform diagram of a current of an inductor of the constant on-time power converter and a current of the inductor that is sampled and held by a conventional current detecting circuit, and FIG. 3B is a signal waveform diagram of a current of an inductor of the constant on-time power converter and a current of the inductor that is sampled and held by the current detecting circuit of the embodiment of the present disclosure.

As shown in FIG. 3A, IL0 represents the current of the inductor of the constant on-time power converter. A conventional current detecting circuit is difficult to calculate the on-time of the lower bridge switch of the constant on-time the power converter. The on-time of the lower bridge switch is equal to an off-time of the upper bridge switch. Therefore, a difference is between an actual average value and an average value of the current IL0 of the inductor that is detected by the conventional current detecting circuit during the on-time of the lower bridge switch. The lower bridge switch is turned on and the conventional current detecting circuit samples and holds the current IL0 of the inductor during a working period of a sample and hold time signal SAS0 as shown in FIG. 3A. As a result, as shown in FIG. 3A, a sensed current SCR0 sampled by the conventional current detecting circuit has triangle waveforms.

For convenience of explanation, IL shown in FIG. 3A represents the current of the inductor L of the constant on-time power converter, which is the same as the current IL0 shown in FIG. 3A. A difference between the conventional current detecting circuit and the current detecting circuit of the present disclosure is that, the sampled and hold circuit SAH of the current detecting circuit of the present disclosure samples the current IL marked by a dotted line AVC at a time point (which is aligned with the detection time point PTD) to obtain a sensed current SCR having a precise average current value of the current IL of the inductor L, during a working period of a sample and hold time signal SAS shown in FIG. 3B.

Figure 4:
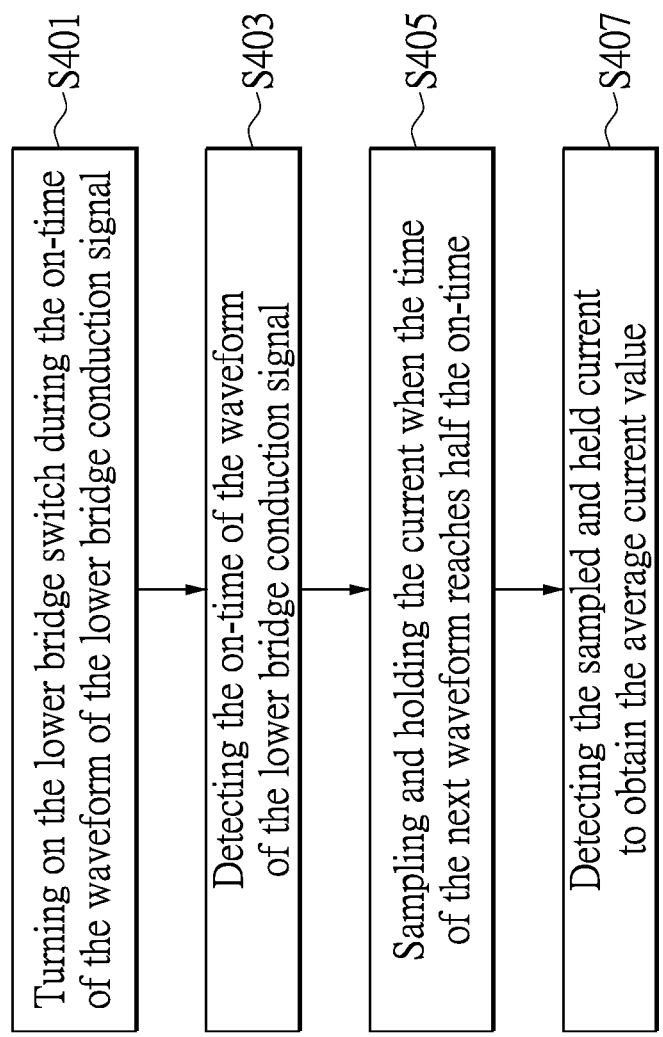
FIG. 4 is a flowchart diagram of steps of a current detecting method of the constant on-time power converter according to the embodiment of the present disclosure.

Reference is made to FIG. 4, which is flowchart diagram of steps of a current detecting method of the constant on-time power converter according to the embodiment of the present disclosure. As shown in FIG. 4, in the embodiment, the current detecting method of the constant on-time power converter includes steps S401 to S407.

Is step S401, the control circuit outputs the lower bridge conduction signal at a high level to the lower bridge switch to turn on the lower bridge switch and turns off the upper bridge switch, during the on-time of each cycle of the lower bridge conduction signal.

Is step S403, the time detecting circuit detects the on-time of the previous cycle of the lower bridge conduction signal to output the on-time detected signal.

Is step S405, the sample and hold circuit samples and holds the current of the inductor at the detection time point of the next cycle of the lower bridge conduction signal, according to the on-time detected signal. The time between the rising edge of the waveform of the next cycle and the detection time point is equal to half the on-time.

Is step S407, the sample and hold circuit determines that the value of the current of the inductor that is sampled at the detection time point is the average current value of the current of the inductor during the on-time.

In summary, the present disclose provides the current detecting circuit and method of the constant on-time power converter. The current detecting circuit detects the on-time of the lower bridge switch (which is equal to an off time of the upper bridge switch) during the previous cycle of the lower bridge conduction signal, and the time length of the next cycle of the lower bridge conduction signal is accordingly determined. After half the on-time has elapsed from the rising edge of the waveform in the next cycle of the lower bridge conduction signal, the current detecting circuit detects the current of the inductor of the constant on-time power converter to obtain the average current value.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A current detecting circuit of a constant on-time power converter, wherein the constant on-time power converter includes an upper bridge switch, a lower bridge switch and a control circuit, the control circuit is connected to the upper bridge switch and the lower bridge switch, a node between the upper bridge switch and the lower bridge switch is connected to one terminal of an inductor, another terminal of the inductor is grounded through a capacitor, the control circuit outputs a lower bridge conduction signal to the lower bridge switch to turn on the lower bridge switch and turns off the upper bridge switch during an on-time of each cycle of the lower bridge conduction signal, the current detecting circuit comprising:

a time detecting circuit connected to the lower bridge switch, and configured to detect the on-time of a previous cycle of the lower bridge conduction signal to output an on-time detected signal; and a sample and hold circuit connected to the time detecting circuit, and configured to sample and hold a current of the inductor at a detection time point of a next cycle of the lower bridge conduction signal according to the on-time detected signal, wherein a time between a rising edge of a waveform of the next cycle of the lower bridge conduction signal and the detection time point is equal to half the on-time.

2. The current detecting circuit according to claim 1, wherein a value of the current of the inductor that is sampled by the sample and hold circuit at the detection time point is an average value of the current of the inductor during the on-time.

3. The current detecting circuit according to claim 1, wherein the lower bridge conduction signal is at a high level during the on-time, which represents that the lower bridge switch is turned on and the upper bridge switch is turned off during the on-time.

4. A current detecting method of a constant on-time power converter, wherein the constant on-time power converter includes an upper bridge switch, a lower bridge switch and a control circuit, the control circuit is connected to the upper bridge switch and the lower bridge switch, a node between the upper bridge switch and the lower bridge switch is connected to one terminal of an inductor, another terminal of the inductor is grounded through a capacitor, the control circuit outputs a lower bridge conduction signal to the lower bridge switch to turn on the lower bridge switch during an on-time of each cycle of the lower bridge conduction signal, and the control circuit outputs an upper bridge off signal to the upper bridge switch to turn off the upper bridge switch during the on-time, the current detecting method comprising the following steps:

detecting the on-time of a previous cycle of the lower bridge conduction signal to output an on-time detected signal by a time detecting circuit; and sampling and holding a current of the inductor at a detection time point of a next cycle of the lower bridge conduction signal according to the on-time detected signal by a sample and hold circuit, wherein a time between a rising edge of a waveform of the next cycle of the lower bridge conduction signal and the detection time point is equal to half the on-time.

5. The current detecting method according to claim 4, wherein a value of the current of the inductor that is sampled by the sample and hold circuit at the detection time point is an average value of the current of the inductor during the on-time.

6. The current detecting method according to claim 4, further comprising the following step:

outputting the lower bridge conduction signal at a high level to turn on the lower bridge switch and turning off the upper bridge switch during the on-time by the control circuit.

\* \* \* \* \*